(12) United States Patent
Wang

(10) Patent No.: US 6,467,938 B1
(45) Date of Patent: Oct. 22, 2002

(54) ENGINE HOOD STAFF

(76) Inventor: Ming-Zhen Wang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/950,352

(22) Filed: Sep. 5, 2001

(51) Int. Cl.[7] .................................................. B60Q 1/00
(52) U.S. Cl. ....................... 362/496; 362/487; 362/549; 362/431; 428/31
(58) Field of Search .................................. 362/496, 487, 362/549, 124, 253, 431; 428/31

(56) References Cited

U.S. PATENT DOCUMENTS

| | | | | |
|---|---|---|---|---|
| 3,578,964 A | * | 5/1971 | Sherman | 362/540 |
| 4,646,208 A | * | 2/1987 | Hayashi et al. | 362/496 |
| 5,359,500 A | * | 10/1994 | Parker | 362/540 |
| 5,413,826 A | * | 5/1995 | Klonikowski | 428/31 |
| 5,779,345 A | * | 7/1998 | Adams | 362/496 |

* cited by examiner

*Primary Examiner*—Laura K. Tso
*Assistant Examiner*—Ronald E. DelGizzi

(57) ABSTRACT

An engine hood staff has a main tube, a hooper having a lower neck inserted in the main tube, the hooper disposed on the main tube, a positioning screw inserted in the lower neck, a first latern disposed on the hooper, a second latern disposed on the first latern, a third latern disposed on the second latern, a base sleeve disposed on the third latern, an ornament article disposed on the base sleeve, an inner tube passing through the first latern, the second latern, the third latern and the base sleeve, the inner tube disposed on the hooper, and a lamp disposed on the inner tube.

3 Claims, 6 Drawing Sheets

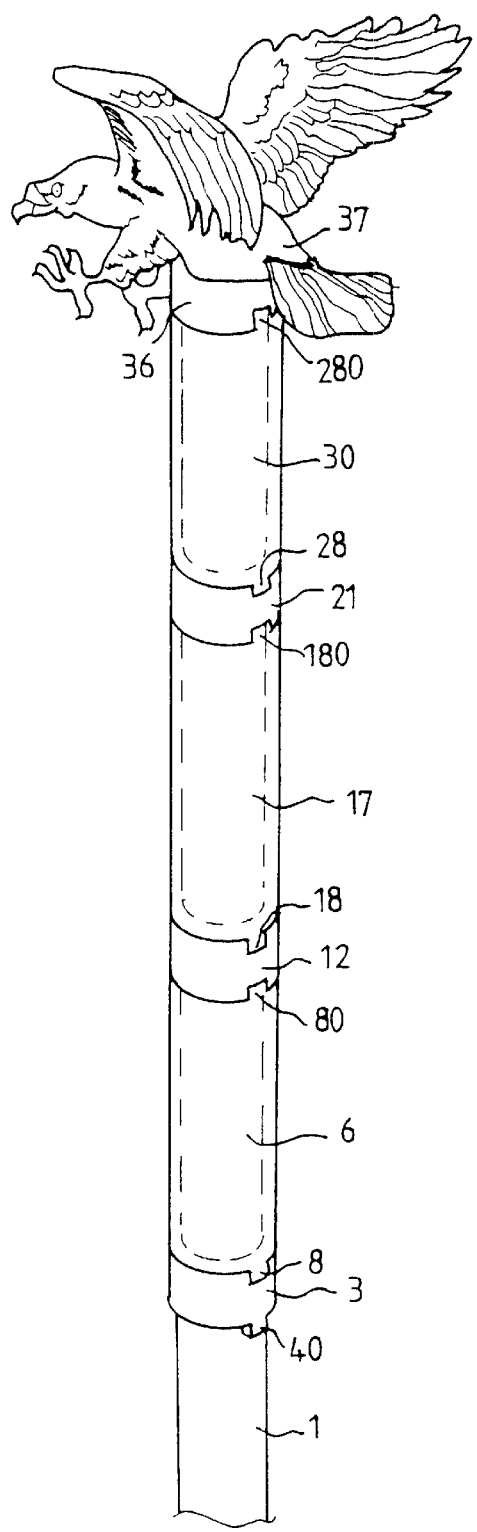
F I G. 5

ENGINE HOOD STAFF

BACKGROUND OF THE INVENTION

The present invention relates to an engine hood staff. More particularly, the present invention relates to an engine hood staff of a vehicle.

Referring to FIGS. 1 to 3, a conventional engine hood staff has a lower tube 48, an upper tube 44, and a connector pipe 42, disposed between the lower tube 48 and the upper tube 44. The connector pipe 42 has a through hole 43 and an embossed periphery 50. A lamp 46 has a socket 47 inserted in the through hole 43 of the connector pipe 42, and a bulb 49 disposed on the socket 47. A hollow base disk 450 receives the upper tube 44. An ornament article 45 is disposed on the hollow base disk 450. The upper tube 44 is made of an acrylic material so that the upper tube 44 is not transparent.

SUMMARY OF THE INVENTION

An object of the present invention is to provide an engine hood staff which is assembled by a plurality of laterns so that a length of the engine hood staff can be varied.

Accordingly, an engine hood staff comprises a main tube, a hooper having a lower neck inserted in the main, tube, the hooper disposed on the main tube, a positioning screw inserted in the lower neck, a first latern disposed on the hooper, a second latern disposed on the first latern, a third latern disposed on the second latern, a base sleeve disposed on the third latern, an ornament article disposed on the base sleeve, an inner tube passing through the first latern, the second latern, the third latern and the base sleeve, the inner tube disposed on the hooper, and a lamp disposed on the inner tube. The positioning screw fastens the hooper and the inner tube together. The hooper further has a hollow interior, a pair of lower protrusions, and a pair of second upper grooves. The first latern has a first lower sleeve, a first upper sleeve, a pair of first lower protruded blocks, a pair of first upper protruded blocks, and a first through hole. The second latern has a second lower sleeve, a second upper sleeve, a pair of second lower protruded blocks, a pair of second upper protruded blocks, and a second through hole. The third latern has a third lower sleeve, a third upper sleeve, a pair of third lower protruded blocks, a pair of third upper protruded blocks, and a third through hole. The base sleeve has a pair of lower grooves for receiving the lower protrusions of the hooper. The main tube has a pair of first upper grooves for receiving the lower protrusions of the hooper.

BRIEF DESCRIPTION OF THE DRAWINGS

FIG. 5 is a perspective assembly view of an engine hood staff of a preferred embodiment in accordance with the present invention.

DETAILED DESCRIPTION OF THE INVENTION

Figure 1:
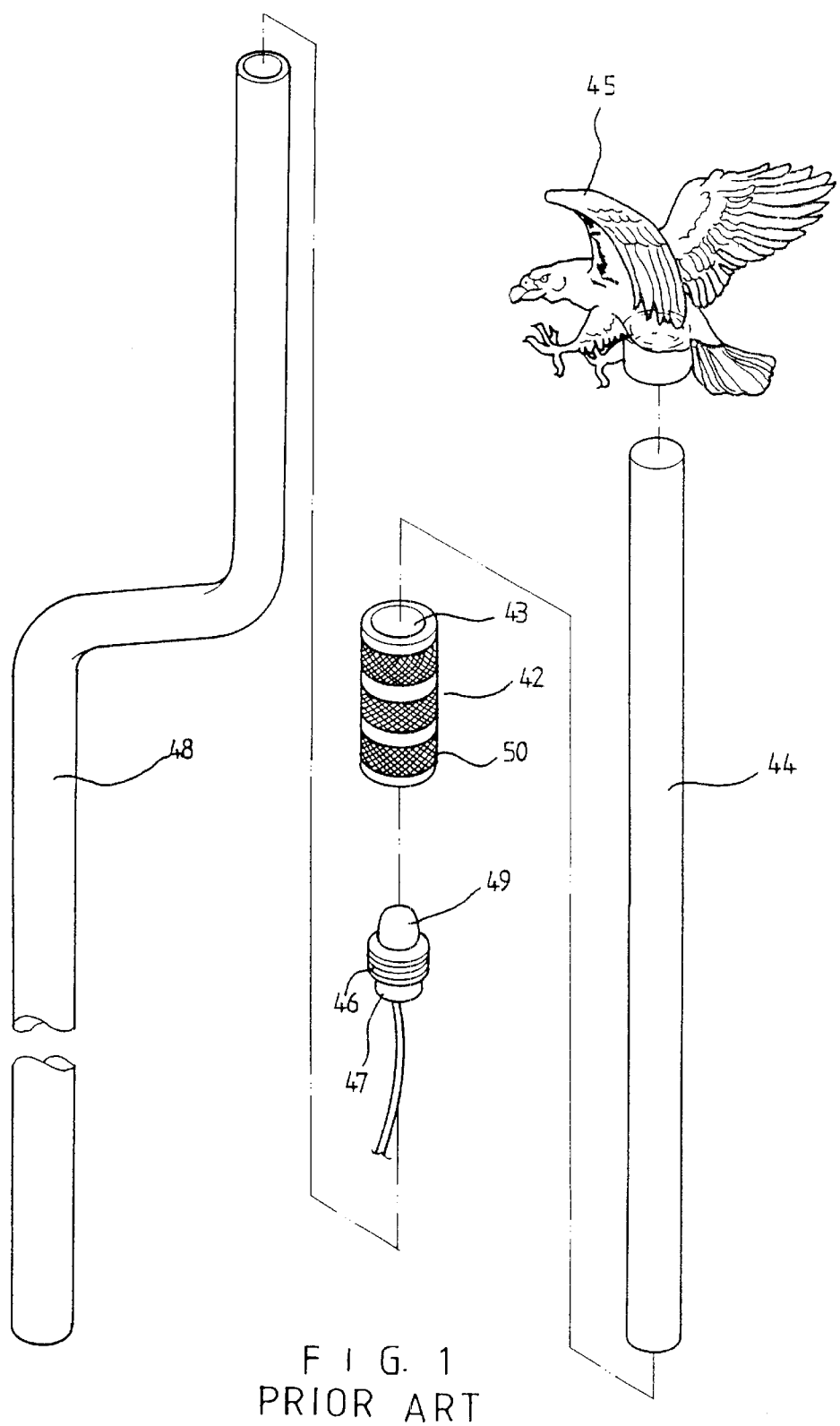
FIG. 1 is a perspective exploded view of an engine hood staff of the prior art.
Figure 2:
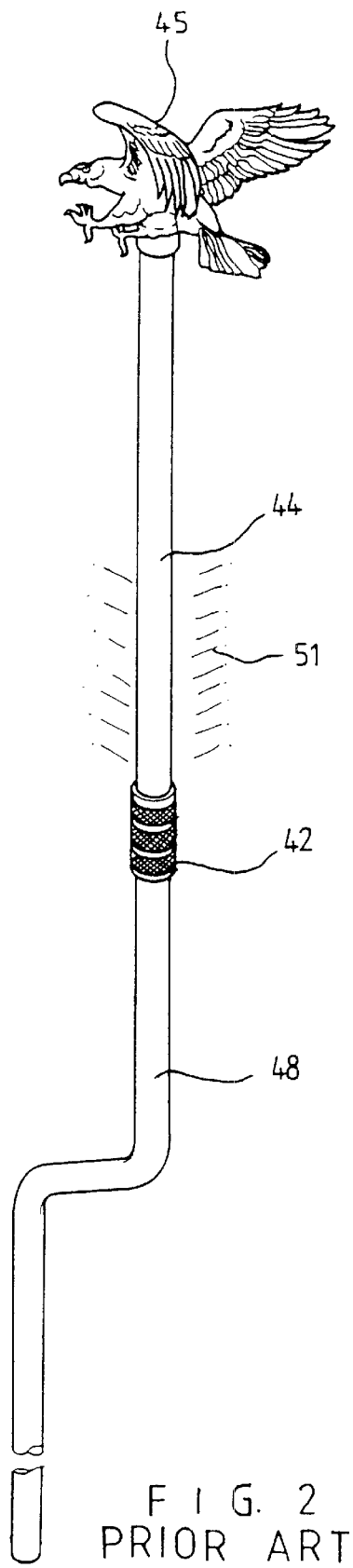
FIG. 2 is a perspective assembly view of an engine hood staff of the prior art.
Figure 3:
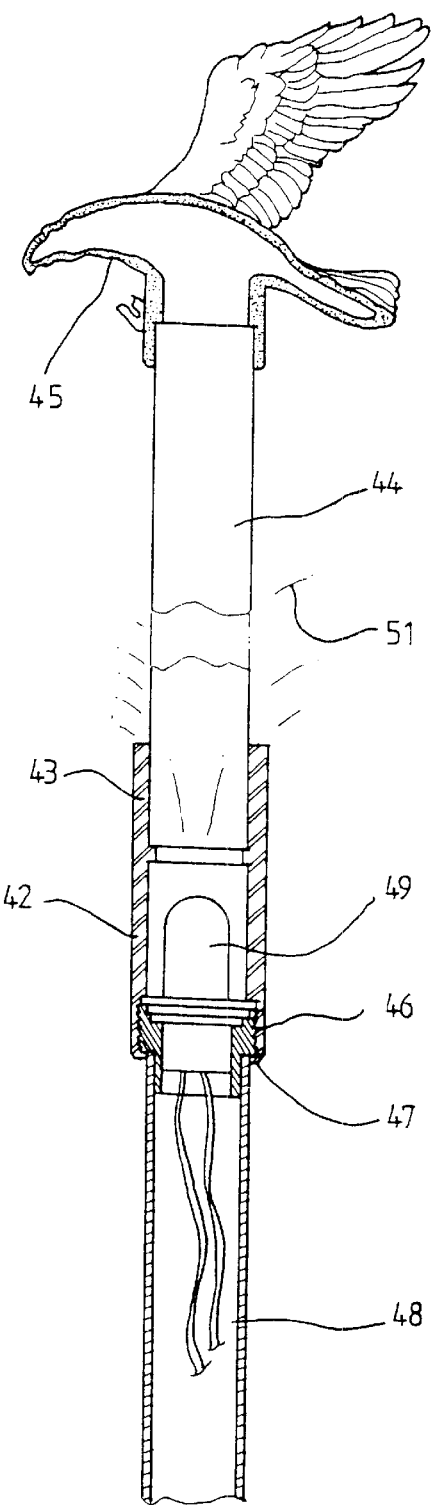
FIG. 3 is a sectional assembly view of an engine hood staff of the prior art.
Figure 4:
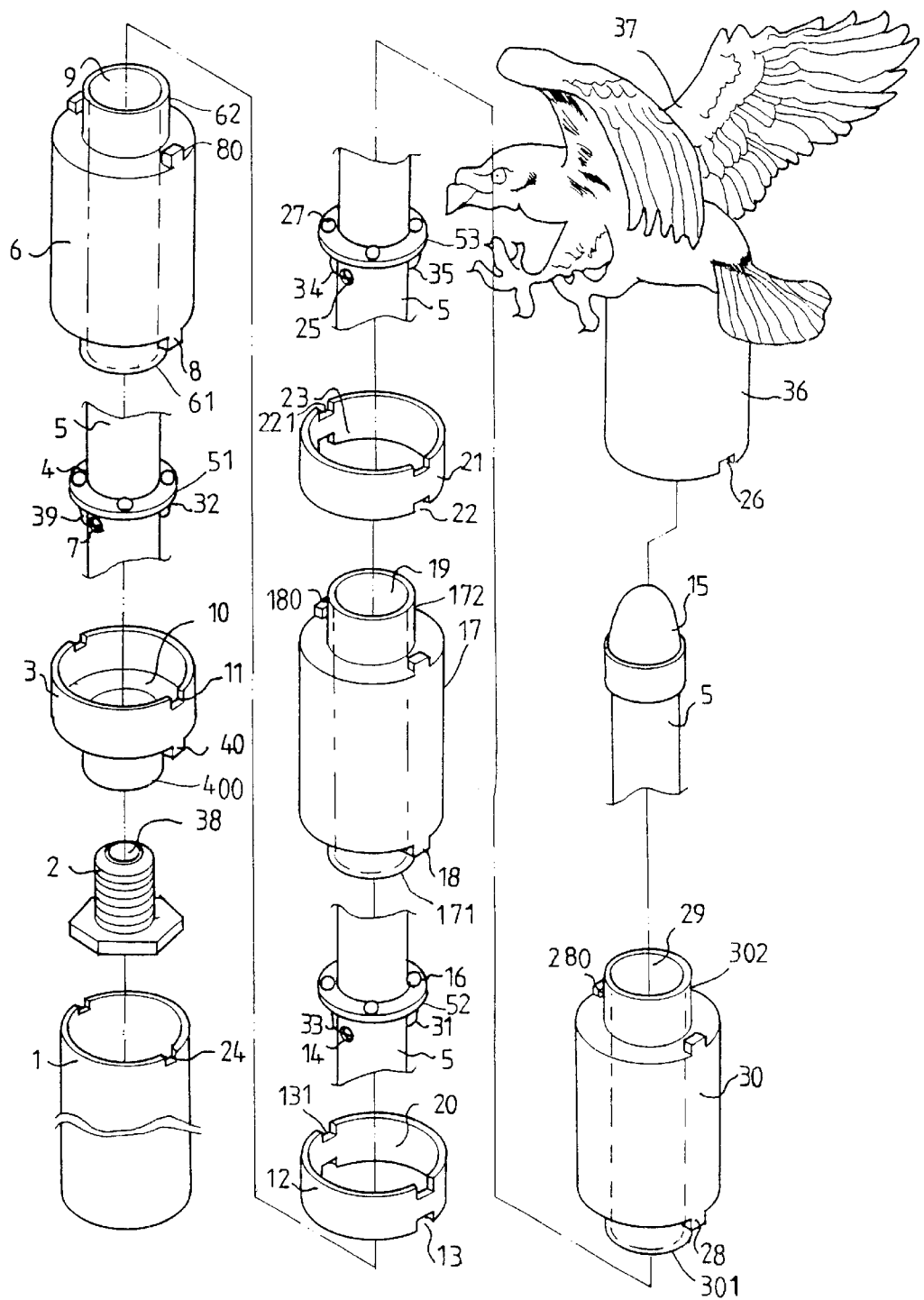
FIG. 4 is a perspective exploded view of an engine hood staff of a preferred embodiment in accordance with the present invention.
Figure 6:
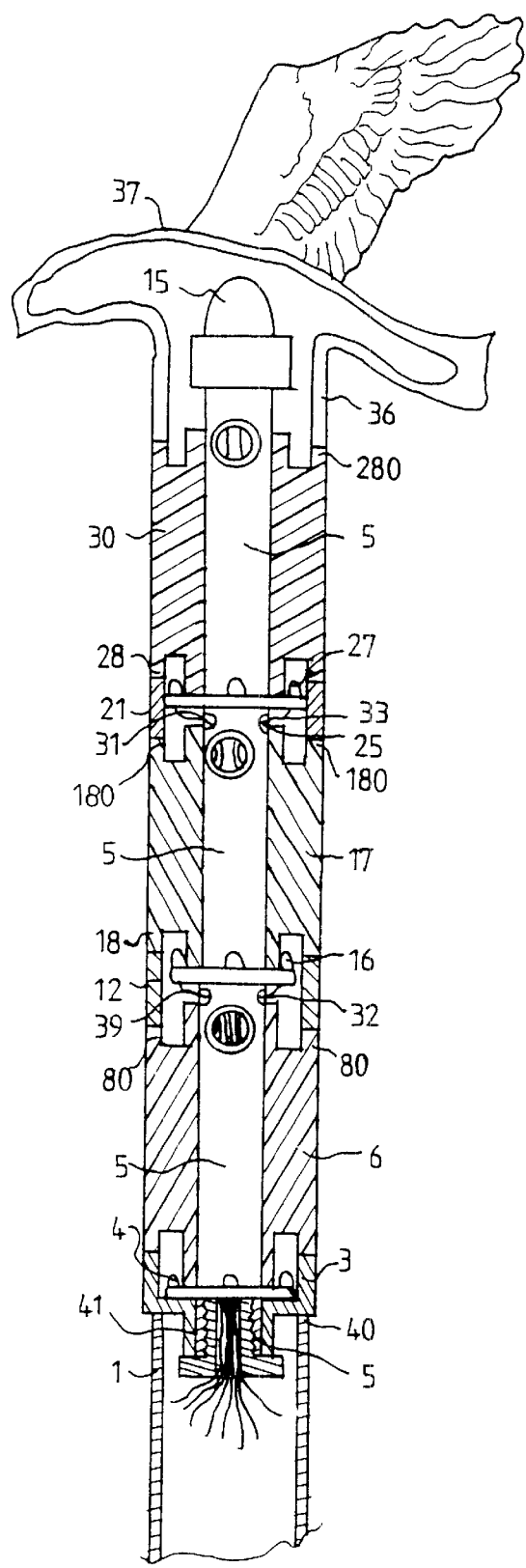
FIG. 6 is a sectional assembly view of an engine hood staff of a preferred embodiment in accordance with the present invention.

Referring to FIGS. 4 to 6, an engine hood staff comprises a main tube 1, a hooper 3 having a lower neck 400 inserted in the main tube 1, the hooper 3 disposed on the main tube 1, a positioning screw 2 inserted in the lower neck 400, a first latern 6 disposed on the hooper 3, a second latern 17 disposed on the first latern 6, a third latern 30 disposed on the second latern 17, a base sleeve 36 disposed on the third latern 30, an ornament article 37 disposed on the base sleeve 36, an inner tube 5 passing through the first latern 6, the second latern 17, the third latern 30 and the base sleeve 36, the inner tube 5 disposed on the hooper 3, and a lamp 15 disposed on the inner tube 5.

The positioning screw 2 fastens the hooper 3 and the inner tube 5 together.

The positioning screw 2 has a round aperture 38.

The hooper 3 further has a hollow interior 10, a pair of lower protrusions 40, and a pair of second upper grooves 11.

The first latern 6 has a first lower sleeve 61, a first upper sleeve 62, a pair of first lower protruded blocks 8, a pair of first upper protruded blocks 80, and a first through hole 9.

The second latern 17 has a second lower sleeve 171, a second upper sleeve 172, a pair of second lower protruded blocks 18, a pair of second upper protruded blocks 180, and a second through hole 19.

The third latern 30 has a third lower sleeve 301, a third upper sleeve 302, a pair of third lower protruded blocks 28, a pair of third upper protruded blocks 180, and a third through hole 29.

The base sleeve 36 has a pair of lower grooves 26 for receiving the lower protrusions 40 of the hooper 3.

The main tube 1 has a pair of first upper grooves 24 for receiving the lower protrusions 40 of the hooper 3.

A first collar 12 has a pair of first lower noches 13 and a pair of first upper noches 131.

The first collar 12 surrounds the first upper sleeve 62 of the first latern 6 and the second lower sleeve 171 of the second latern 17.

A second collar 21 has a pair of second lower noches 22 and a pair of second upper noches 221.

The second collar 21 surrounds the second upper sleeve 172 of the second latern 17 and the third lower sleeve 301 of the third latern 30.

A first ring 51 surrounds the inner tube 5. The first ring 51 is disposed in the hooper 3.

A second ring 52 surrounds the inner tube 5. The second ring 52 is enclosed by the first collar 12.

A third ring 53 surrounds the inner tube 5. The third ring 53 is enclosed by the second collar 21.

A plurality of first bulbs 4 are disposed on the first ring 51.

A plurality of second bulbs 16 are disposed on the second ring 52.

A plurality of third bulbs 27 are disposed on the third ring 53.

The inner tube 5 has a pair of first apertures 7 to receive a first wire 39 and a second wire 32, a pair of second apertures 14 to receive a third wire 33 and a fourth wire 31, and a pair of third apertures 25 to receive a fifth wire 34 and a sixth wire 35.

The invention is not limited to the above embodiment but various modification thereof may be made. Further, various changes in form and detail may be made without departing from the scope of the invention.

I claim:
1. An engine hood staff comprises:
a main tube,
a hooper having a lower neck inserted in the main tube,
the hooper disposed on the main tube,
a positioning screw inserted in the lower neck,
a first latern disposed on the hooper,
a second latern disposed on the first latern,
a third latern disposed on the second latern,
a base sleeve disposed on the third latern,
an ornament article disposed on the base sleeve,
an inner tube passing through the first latern, the second latern, the third latern and the base sleeve,
the inner tube disposed on the hooper,
a lamp disposed on the inner tube,
the positioning screw fastening the hooper and the inner tube together,
the hooper further having a hollow interior, a pair of lower protrusions, and a pair of second upper grooves,
the first latern having a first lower sleeve, a first upper sleeve, a pair of first lower protruded blocks, a pair of first upper protruded blocks, and a first through hole,
the second latern having a second lower sleeve, a second upper sleeve, a pair of second lower protruded blocks, a pair of second upper protruded blocks, and a second through hole,
the third latern having a third lower sleeve, a third upper sleeve, a pair of third lower protruded blocks, a pair of third upper protruded blocks, and a third through hole,
the base sleeve having a pair of lower grooves for receiving the lower protrusions of the hooper, and
the main tube having a pair of first upper grooves for receiving the lower protrusions of the hooper.

2. The engine hood staff as claimed in claim 1, wherein a first collar has a pair of first lower notches and a pair of first upper notches, and the first collar surrounds the first upper sleeve of the first latern and the second lower sleeve of the second latern.

3. The engine hood staff as claimed in claim 2, wherein a second collar has a pair of second lower notches and a pair of second upper notches, and the second collar surrounds the second upper sleeve of the second latern and the third lower sleeve of the third latern.

* * * * *